UNITED STATES PATENT OFFICE.

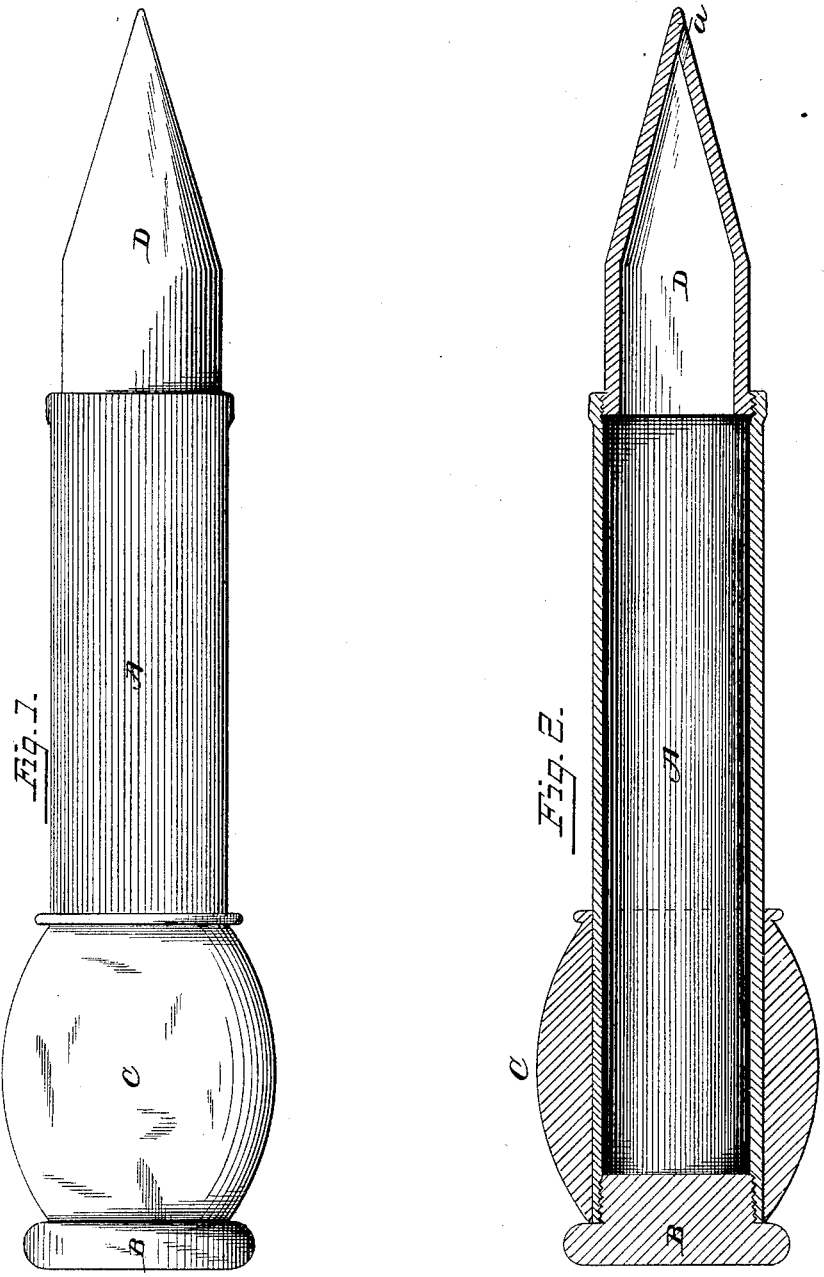

ROBERT W. COFFEE, OF LIBERTY, VIRGINIA.

SOLDERING-IRON.

SPECIFICATION forming part of Letters Patent No. 325,158, dated August 25, 1885.

Application filed December 30, 1884. (No model.)

*To all whom it may concern:*

Be it known that I, ROBERT W. COFFEE, a citizen of the United States, residing at Liberty, in the county of Bedford and State of Virginia, have invented a new and useful Improvement in Soldering-Irons, of which the following is a specification, reference being had to the accompanying drawings.

This invention relates to soldering-irons, and especially to that class of the same in which the balls, lumps, or sticks of solder are inclosed in the soldering-head, which is heated, melting the balls or lumps and causing the molten metal to issue from an opening at the front end of the head in a small jet or stream; and it has for its object to provide a device of this character which will possess superior advantages in point of simplicity, durability, convenience, inexpensiveness, and general efficiency.

A further object of the invention is to utilize the handle of the iron for containing a supply of solder, and, furthermore, to provide means for admitting air through the handle to the head, causing the necessary atmospheric pressure to be produced sufficient to cause the solder to run out through an opening near the point of the head in a small stream.

With these ends in view the said invention consists in certain details of construction and combination of parts, as hereinafter set forth, and particularly pointed out in the claims.

In the accompanying drawings, Figure 1 is a side elevation of my improved soldering-iron. Fig. 2 is a longitudinal vertical section of the same.

Like letters are used to designate corresponding parts in the several figures.

Referring to the drawings, A designates a hollow cylindrical barrel bored longitudinally from end to end, and made of any suitable metal which will answer the purposes, the extreme rear end of the barrel being internally threaded to receive an externally-threaded cap, B, which closes the opening to the barrel at the rear end, and may be readily removed to permit the admission of air thereto. A sleeve or collar, C, is slipped over and made fast to the barrel forward of the cap, and occupies nearly one-half of the length of said barrel, said collar or sleeve being preferably constructed from wood or other material which will be a good non-conductor of heat, so that in handling the instrument the hands of the operator will not be burned or otherwise affected by the heat from the barrel.

The front end of the barrel is slightly enlarged or spread out, and internally threaded to receive the end of the soldering-head D. The latter is of substantially the usual form, being tapered off to a point, the lower side in rear of the point having an opening, *a*, through which the solder, when melted, issues therefrom in a small stream.

The operation of my invention will be readily understood from the foregoing description, taken in connection with the annexed drawings.

In preparing the soldering-iron for use, the lumps, sticks, or balls of solder are packed or laid within the head and barrel until the latter is filled, when the cap is fitted in place, and the instrument is in condition to be heated. The head is heated in the usual manner, causing the balls which are nearest the point of the head to be first melted. Now, the air which was formerly within the barrel and head has been driven out by the heat, so that there is a partial vacuum within the same, and this being so the molten solder will remain suspended around the opening *a* and the instrument will be totally impracticable as a soldering-iron unless some means could be devised to effect the expulsion of this molten material. I accomplish this end by unscrewing the cap B, causing the cold air from the outside to enter and traverse the length of the barrel, filling the vacuum until it reaches the head, when the atmospheric pressure produced forces the molten solder out through the opening *a*, for the purposes well known in the art. As the balls or lumps of solder within the head are used others from the barrel will roll down within the head to supply the deficiency, and thus a continual supply will be kept up as long as desired.

It will be observed that after the cap is detached the solder will run from the opening in a stream sufficient for the wants of the workman, the cap being closed when it is desired to again heat the iron.

In this manner a soldering-tool will be produced which will be superior to those in common use in many respects, always retaining a supply of solder within the iron and avoiding the slow, clumsy, and tedious process of soldering with the old iron. The iron is simple in construction, can be manufactured at a slight cost, is readily operated, and will prove of great utility and advantage for the purposes intended.

Having described my invention, I claim—

1. As an improvement in soldering-irons, the combination, with the hollow barrel, of the soldering-head fitted to one end of the same and communicating therewith to receive a supply of balls or lumps of solder therefrom, an opening provided in the soldering-head, and means, substantially as described, for closing and for admitting air to the barrel to provide sufficient pressure for the expulsion of the molten solder through the opening in said head, as set forth.

2. In a soldering-iron, the combination, with the hollow barrel, of the soldering-head fitted to one end of the same and made hollow, so as to communicate with the barrel to receive a supply of balls or lumps of solder therefrom, an opening at the point or front end of the head, and a cap for closing the rear end or opening to the barrel, for the purpose of supplying the same with the soldering material, and also to admit air within the same, as set forth.

In testimony that I claim the foregoing as my own I have hereto affixed my signature in presence of two witnesses.

ROBERT W. COFFEE.

Witnesses:
WM. N. MOORE,
EDWARD G. SIGGERS.